United States Patent [19]

Böhringer

[11] 4,186,330
[45] Jan. 29, 1980

[54] VOLTAGE REGULATOR FOR A TELEVISION DEFLECTION CIRCUIT

[75] Inventor: Walter Böhringer, Schlieren, Switzerland

[73] Assignee: RCA Corporation, New York, N.Y.

[21] Appl. No.: 849,462

[22] Filed: Nov. 7, 1977

[30] Foreign Application Priority Data

Nov. 23, 1976 [GB] United Kingdom ............... 48822/76

[51] Int. Cl.² .......................................... H01J 29/70
[52] U.S. Cl. .................................... 315/411; 315/408
[58] Field of Search ................................ 315/408, 411

[56] References Cited

U.S. PATENT DOCUMENTS

| | | | |
|---|---|---|---|
| 3,767,960 | 10/1973 | Ahrens | 315/408 |
| 3,881,135 | 4/1975 | Dietz | 315/408 |
| 3,885,198 | 5/1975 | Pritchard et al. | 315/411 |
| 3,928,787 | 12/1975 | Geiger | 315/403 |
| 3,993,931 | 11/1976 | Hollander | 315/408 |
| 4,009,426 | 2/1977 | Böhringer | 315/408 |
| 4,013,923 | 3/1977 | Hollander | 315/411 |

Primary Examiner—Malcolm F. Hubler
Attorney, Agent, or Firm—Eugene M. Whitacre; Paul J. Rasmussen; Joseph J. Laks

[57] ABSTRACT

A feedback voltage regulator for a television deflection apparatus having a deflection switching arrangement driving a deflection winding and supplied with power from a source of potential through a first inductor includes a second inductor coupled in series with the first. The second inductor conducts a substantially direct current towards the source of potential. An SCR is coupled in parallel with the second inductor and its conduction is duration modulated in response to the regulated voltage. The duration modulation controls the time during which the direct current is withdrawn from the deflection switching arrangement and first inductor and thereby maintains the regulated voltage substantially constant.

17 Claims, 3 Drawing Figures

VOLTAGE REGULATOR FOR A TELEVISION DEFLECTION CIRCUIT

This invention relates to feedback voltage regulators useful in conjunction with television deflection circuits.

A television horizontal deflection circuit is described in U.S. Pat. No. 3,452,244 issued on June 24, 1969 to W. F. W. Dietz. This deflection circuit uses trace and commutating bidirectional switches coupled together by a reactive energy storage or commutating network. The deflection winding and high voltage transformer are coupled across the trace switch. The commutating switch is coupled to B+ by means of an input inductor.

For various reasons it may be desirable to regulate the voltage at a particular point in the deflection circuit. For example, it may be desirable to regulate the ultor voltage or other voltage derived from the high voltage transformer. Alternatively, deflection current may be maintained constant by regulating a voltage proportional to the current.

A voltage regulator is described in U.S. Pat. No. 3,517,253 issued on June 23, 1970 to W. F. W. Dietz in which the input inductor is paralleled by the working or controlled winding of a saturable reactor (transductor). A steering diode coupled in series with the working winding allows control of the current flowing back to B+ towards the latter part of the commutating interval of the deflection cycle. The control winding of the saturable reactor is coupled to a feedback control circuit in turn controlled by the voltage being regulated.

Another saturable reactor regulator is described in U.S. Pat. No. 3,895,256 issued on July 15, 1975 to Reh, et al. In this arrangement, the working winding of the saturable reactor is coupled in series with the input inductor. The working winding is coupled in parallel with a steering diode poled to allow forward conduction from the power supply to the deflection circuit through the diode and to force the reverse current being controlled to flow through the working winding. In this arrangement, failure of the control current may cause the deflection switching and ultor voltages to become a maximum, which may cause safety or reliability problems.

A forward current regulator is described in U.S. Pat. No. 3,898,524 issued on Aug. 5, 1975 in the name of Reh. In this arrangement, the saturable reactor and its cost are eliminated. Also, the undesirable power consumption arising from alternating or pulsed current flow in the working winding of the saturable reactor is eliminated. In the aforementioned forward current regulator, an SCR is coupled in series with the input inductor and poled for forward current flow from B+ to the deflection components. The gate of the SCR is coupled to a control circuit which as in the case of the saturable reactor control circuit is controlled by the voltage being regulated. This arrangement is sensitive to SCR gating time. False triggering which may be caused by noise coupled into the control circuit will undesirably cause the deflection switching circuit and ultor voltages to rise. The high voltage also rises if the SCR degrades and functions as a diode.

SUMMARY OF THE INVENTION

A kinescope deflection apparatus with a voltage regulator includes a deflection winding and deflection switching means coupled to the deflection winding for controlling the current flow during trace and retrace intervals, and for generating the voltage to be regulated. Energy is coupled to the deflection switching means from a source of energizing potential by way of first inductance means. A second inductance is serially coupled with the first and is paralleled by a controllable switch. The controllable switch is coupled to and controlled by a control means in turn coupled to the voltage being regulated.

DESCRIPTION OF THE INVENTION

Figure 1:
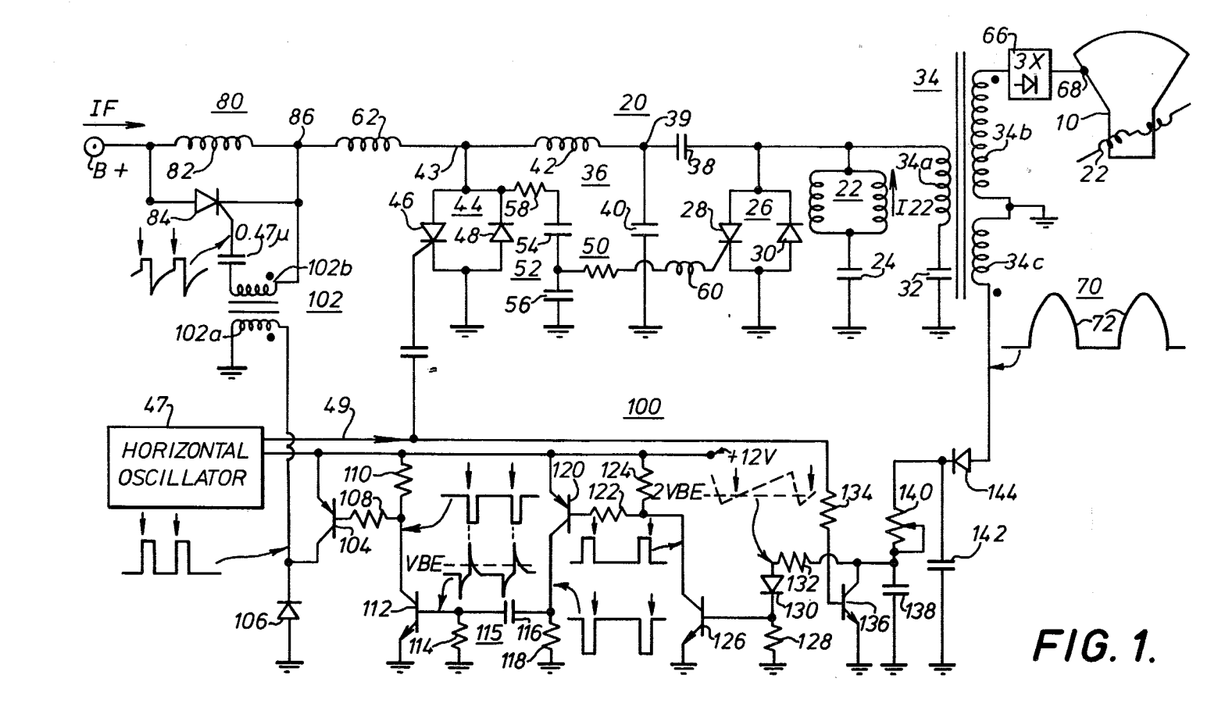
FIG. 1 is a diagram partially in block and partially in schematic form of a portion of the deflection arrangement of a television receiver embodying the invention.

Generally speaking, FIG. 1 includes a kinescope 10 at upper right driven by a horizontal deflection switch or deflection generator designated generally as 20. On the left, a regulator controller designated generally as 80 is coupled between B+ and the horizontal deflection generator. Controller 80 is controlled by a regulator control circuit designated generally as 100.

Deflection generator 20 includes deflection windings designated as 22 which are disposed about the neck of kinescope 10. Windings 22 are coupled in series with an S-shaping capacitor 24. The serial combination of windings 22 and capacitor 24 is coupled in parallel with a trace switch designated generally as 26 and including an SCR or thyristor 28 antiparalleled with a diode 30. Also coupled across switch 26 is the serial combination of a capacitor 32 and the primary winding 34a of a horizontal transformer designated generally as 34. One end of switch 26 is grounded, the other end is coupled to a commutating network designated generally as 36 and including the serial combination of a commutating capacitor 38 and an auxiliary capacitor 40 coupled across switch 26. Commutating network 36 also includes a commutating inductor 42 having one end coupled to the junction of capacitor 38 and 40 at a point 39.

The other end of commutating inductor 42 is coupled at a point 43 to one end of a commutating switch designated generally as 44, the other end of which is connected to ground. Switch 44 includes an SCR 46 antiparalleled with a diode 48. Switch 44 is controlled by gating pulses applied to the gate of SCR 46 from a horizontal oscillator 47 over a conductor 49. A trace switch gating circuit designated generally as 50 is coupled to the commutating switch and to the gate of SCR 28. Gating circuit 50 includes a capacitive voltage divider designated generally as 52 and including capacitors 54 and 56 coupled by a resistor 58 across commutating switch 44. The junction of capacitors 54 and 56 is coupled via a waveshaping circuit comprising an inductor 60 to the gate of thyristor 28.

A high voltage winding 34b of transformer 34 has one end grounded and the other end connected to the anode end of an ultor rectifier 66, the cathode end of which is connected to an ultor terminal 68 of kinescope 10. A further secondary winding 34c of transformer 34 has one end grounded and is poled to produce a recurrent sequence designated as 70 of positive-going retrace pulses illustrated as 72. Deflection circuit 20 also includes an input inductor 62 through which power for energizing the deflection circuit and the kinescope flows from B+.

Input inductor 62 is coupled in series with a reverse current control inductor 82 of regulator controller 80. The end of reverse current inductor 82 remote from inductor 62 is connected to a B+ terminal of a source of energizing potential. The anode of a thyristor 84 functioning as a controllable switch means is coupled to B+ and the cathode is connected to a junction 86 of input inductor 62 and reverse current inductor 82.

The gate-cathode junction of thyristor 84 is coupled in parallel with the secondary winding 102b of a transformer designated generally as 102. One end of primary winding 102a of transformer 102 is coupled to ground and the other end is connected to the collector of a driver transistor 104. A diode 106 is coupled across winding 102b and is poled to damp the current therein when transistor 104 stops conducting. The series combination of resistors 108 and 110 is coupled across the base-emitter junction of transistor 104, and their junction is coupled to the collector of an inverting amplifier transistor 112. The base of transistor 112 is coupled to the output of a differentiating circuit designated as 115 and consisting of a resistor 114 and capacitor 116, the input of which is driven by an inverting amplifier including a resistor 118 and transistor 120.

The base of transistor 120 is driven through a resistor 122 from the output of a switching stage including a resistor 124 and transistor 126. A resistor 128 is coupled across the base-emitter junction of transistor 126. The base of transistor 126 is coupled to the cathode of a diode 130, the anode of which is coupled to one end of a sawtooth charging capacitor 138 by a resistor 132. The collector-to-emitter path of a discharging transistor 136 is coupled in parallel with capacitor 138, and its emitter is grounded. The base of transistor 136 is coupled to conductor 49 by a resistor 134.

Sawtooth charging capacitor 138 is charged through a variable resistor 140 from the output of a filter capacitor 142. The input of filter capacitor 124 is connected to the cathode of a peak rectifier diode 144. The degenerative regulator feedback loop is completed by connecting the anode of diode 144 to the end of winding 34C remote from ground, thereby establishing the magnitude of pulses 72 as the regulated parameter.

Figure 2:
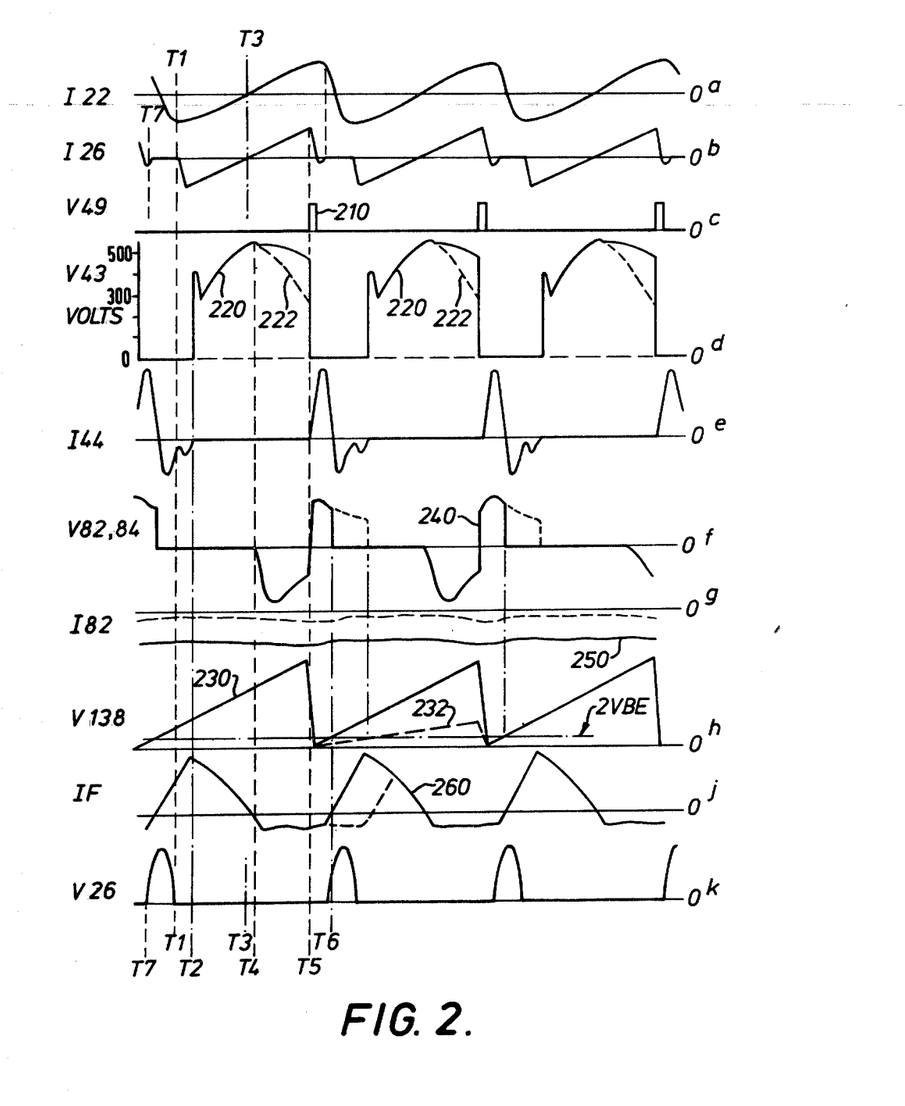
FIG. 2 illustrates amplitude-time waveforms occurring in the circuit of FIG. 1 during operation.

In operation, immediately prior to the beginning of the commutating interval at a time T5, a particular amount of energy is stored in commutating network 36 in the form of voltage across capacitors 38 and 40, and is decreasing in a resonant manner as current is returned to B+ through inductors 62 and 82. Thyristor 84 is reverse biased and nonconductive. Also at time T5, deflection current I22 is flowing upwards through deflection winding 22, as shown in FIG. 2a, increasing in magnitude under the impetus of the voltage across capacitor 24. A similar current flows in primary winding 34a, driven by the voltage on capacitor 32. The sum of the deflection and primary winding currents flows through SCR 28 of closed switch 26 to ground as illustrated in FIG. 2b. A filtered direct voltage representative of the peak magnitude of previous retrace pulses at winding 34c appears across filter capacitor 142. Charging capacitor 138 is reaching maximum charge.

At time T5, a gating pulse 210 as represented in FIG. 2c is generated by horizontal oscillator 47 and applied by conductor 49 to the gate of SCR 46 and to the base of transistor 136. This simultaneously closes or renders switch 44 conductive to begin commutation as shown by voltage 220 across switch 44 in FIG. 2d, and renders transistor 136 momentarily conductive, discharging capacitor 138 and allowing a ramp voltage 230 to be generated across capacitor 138 as shown in FIG. 2h.

When switch 44 is closed, a complex series of resonant energy interchanges takes place, by which a substantial portion of the energy stored in commutating network 36 is transferred to the deflection winding and to primary 34a to make up the energy consumed in deflection losses and in the loads on transformer 34. Since primary 34a is in parallel windings 22, its current and that of the deflection windings are equivalent and may be described as though combined into the deflection current.

When switch 44 closes, point 43 is grounded and the voltage goes to zero as shown in FIG. 2d, and commutating network 36 is isolated from B+ and from inductors 62 and 82. Closure of switch 44 also forms a resonant commutating current path including closed switch 26, capacitor 38, and inductor 42. Switch 44 current is illustrated in FIG. 2e. Since the deflection current flowing in SCR 28 initially exceeds the commutating current in the resonant current path, the commutating current merely reduces the current flowing in SCR 28. As the resonant commutating current increases to equal and exceed the deflection current, SCR 28 opens and the excess of the commutating current over the deflection current flows in diode 30. With diode 30 conducting, switch 26 is still closed and the deflection current continues to increase.

With switch 44 closed, inductor 82 has a voltage impressed across it after time T5 as shown in FIG. 2f which opposes the flow of current to B+. Consequently, inductor 82 gives up stored energy and reverse current decreases slowly, as illustrated by waveform 250 in FIG. 2g between times T5 and T6.

At a later time T6, ramp voltage 230 reaches 2 Vbe, as shown in FIG. 2h, and transistor 126, acting with diode 130 as a comparator, switches into conduction. The resulting pulse at the collector of transistor 126 is inverted and applied to differentiator 115, and the differentiated trailing edge of the pulse gates SCR 84 into conduction. Waveforms representing the progress of the gating trigger through control circuit 100 appear in FIG. 1, with arrows denoting time T6.

When SCR 84 is gated into conduction, inductor 82 is short-circuited, diverting the reverse current of inductor 82 from the B+ supply through SCR 84 and back to inductor 82. This prevents further significant reduction in inductor 82 current because the voltage across inductor 82 is decreased as illustrated in FIG. 2f. With SCR 84 conducting, B+ is impressed across inductor 62, tending to promote forward current. The reverse current in inductor 62 goes to zero quickly, and begins to increase in the forward direction and flows through SCR 84 and through switch 44 in the same direction as the initial commutating current. The current in inductor 62 equals the forward current IF at the B+ terminal during those times when SCR 84 is conductive, and equals the current in inductor 82 when SCR 84 is nonconductive, as shown by waveform 260 of FIG. 2j.

The commutating current through inductor 42 decreases to zero as the commutating energy is stored on capacitors 38 and 40 in a polarity reversed from that in which its was first stored. When the commutating current attempts to reverse, diode 30 and trace switch 26 open and retrace begins at a time T7. During retrace the deflection current flows in the commutating circuit, causing a large retrace voltage as illustrated in FIG. 2k across trace switch 26 which rapidly reverses the current in the deflection windings, as shown in FIG. 2a, and transfers extra energy thereto. Commutating switch 44 remains closed during the retrace interval, and the stored energy in inductor 62 increases as its forward current 260 increases. Retrace ends at time T1 when the voltage across trace switch 26 goes to zero and diode 30 becomes conductive.

Near the end of the retrace interval, the reversed current in commutating network 36 becomes equal to and exceeds the forward current in inductor 62, whereupon SCR 46 of switch 44 opens, and diode 48 conducts the excess of the commutating current over the current in inductor 62.

The commutating current in inductor 42 and capacitors 38 and 40 decreases as the remaining commutating energy is stored as voltage on capacitors 38 and 40. When the increasing current in inductor 62 equals the decreasing commutating current in switch 44, diode 48 becomes nonconductive and commutating switch 44 opens at a time T2 to begin an energy accumulation interval.

During the energy accumulation interval extending from the time T2 at which commutation ends to time T4, the energy stored as current in inductor 62 is transferred to commutating network 36 in a resonant manner, with a period depending upon inductors 42 and 62, and capacitors 38 and 40.

The voltage at junction point 39 of capacitors 38 and 40 rises towards a peak as energy is accumulated. At a time T4, the voltage at junction 39 peaks as the current in inductors 42 and 62 goes to zero. While the voltage at point 43 as shown in FIG. 2d is a good approximation of the voltage at point 39, at T4 the voltages are identical. Since the voltage at point 39 across capacitors 38 and 40 is a maximum, maximum energy accumulation has taken place at time T4.

Immediately after time T4, the high voltage at point 39 causes a reversal of current flow in inductors 42 and 62. Thyristor 84 becomes nonconductive. This removes the short-circuit from inductor 82 which is then in series with inductors 42 and 62. The current in inductors 42 and 62 rises negatively quickly to equal the relatively constant current in inductor 82.

During the interval from T4 to T5, inductors 42, 62 and 82 form a voltage divider across which a voltage equal to the difference between the voltage at point 39 and B+ is impressed. The portion of the voltage appearing across inductor 82 also appears across thyristor 84 and is illustrated in FIG. 2f. During this interval, the voltage is poled to increase the reverse-directed current in inductor 82 in such a manner that the increase in current I82 is the integral of the negative part of voltage 240.

While the current in inductor 82 appears to be relatively constant, inductors 42, 62 and 82 actually form with capacitors 38 and 40 a resonant circuit having a period which is relatively long by comparison to the period when inductor 82 is shorted by thyristor 84. This resonant circuit decreases the voltage at point 39 in a resonant manner, with the rate of decrease of the voltage determined essentially by the initial current in inductor 82. The voltage across inductor 82 and thyristor 84 decreases towards zero as the voltage at point 43 decreases towards B+.

At time T5, the commutating switch is closed in order to transfer the energy stored in the commutating network at the end of the regulating interval to the deflection windings, as described previously.

The amount of charge removed from the commutating network as current during the interval T4–T5 is determined principally by the current in inductor 82 at time T4. Control of this current is achieved by controlling that duration, T5 to T6, during which SCR 84 is open and voltage is applied across inductors 62 and 82 in a polarity to reduce the current in the inductors.

During the interval T5 to T6, a voltage is applied across inductor 82 and thyristor 84, as shown in FIG. 2f, which tends to decrease the current in the inductor in an amount proportional to the integral of that portion of voltage 240 above the zero line. The current in inductor 82 decreases between times T5 and T6 at a rate determined by the magnitude of voltage 240 in this interval. At time T6, the reverse current in inductor 82 is reduced from its peak value. At time T6, when thyristor 84 is gated into conduction, the voltage across inductor 82 is reduced to zero and the voltage tending to reduce the reverse current is thereby reduced to zero. After time T6, therefore, the reduction in current in inductor 82 is minimized. Control of the time T6 at which thyristor 84 is gated during the horizontal deflection interval determines whether the integral of the negative or positive portions of voltage waveform 240 predominates and consequently whether the average reverse current in inductor 82 increases or decreases. An increasing reverse current in inductor 82 causes energy to be extracted more quickly from the commutating network during the interval T4 to T5, and results in less energy remaining therein for transfer to the deflection components during the succeeding commutation cycle.

Early gating of thyristor 84 tends to increase the reverse current in inductor 82 and decrease the energy available for the next commutation cycle, and thus causes a decrease in the regulated voltage. Similarly, late gating reduces the reverse current and results in a higher regulated voltage. The periodic short circuiting of inductor 82 results in an average value of inductance added in series with inductor 62 which may be effectively varied by varying the duty cycle of the shorting period provided by SCR 84 conduction. Thus, a reduction in the pulse voltage at secondary 34C results in a lower ramp voltage 232, late gating of thyristor 84 and decreased reverse current in inductor 82, as illustrated by the dotted waveforms of FIGS. 2f–2j, which action tends to restore the pulse voltage in a feedback manner.

Figure 3:
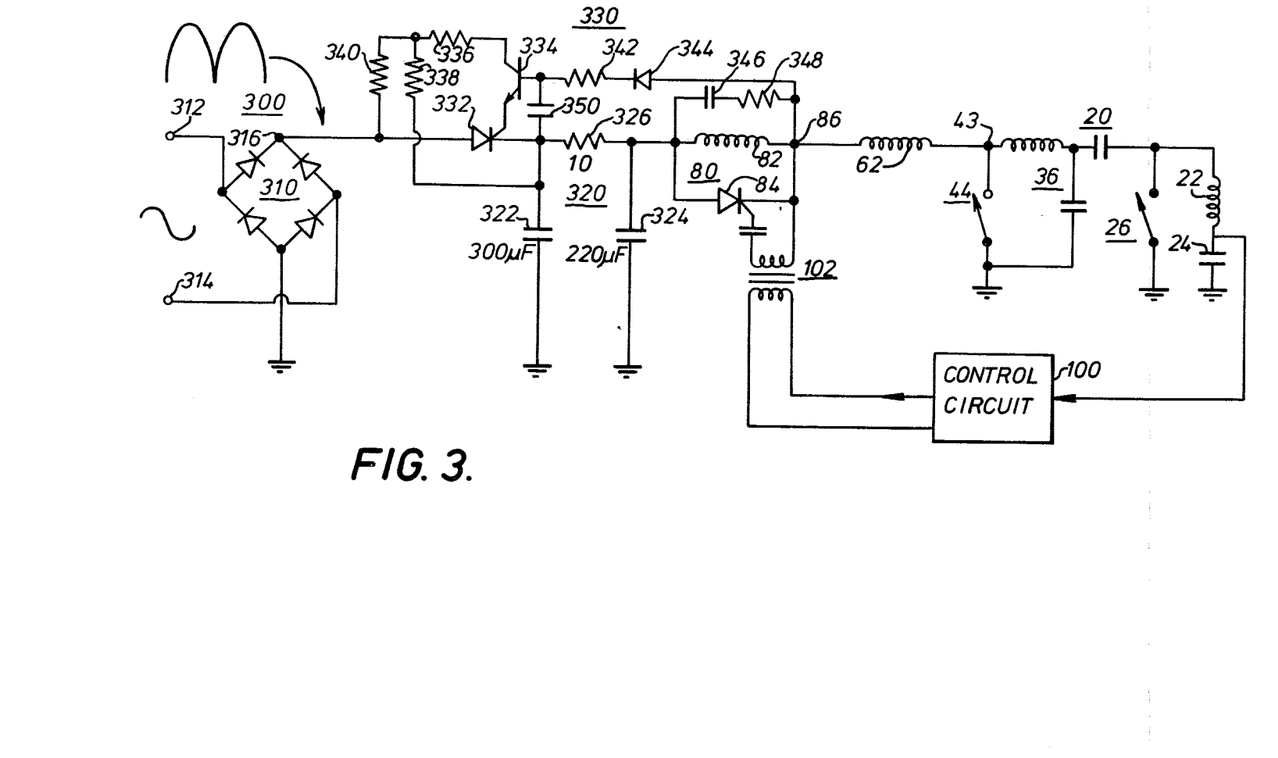
FIG. 3 is a diagram partially in block and partially in schematic form of a television deflection arrangement embodying the invention.

In FIG. 3, a horizontal deflection circuit 20, regulator controller 80 and control circuit 100 similar to those of FIG. 1 are arranged to be powered from an alternating current line. Generally, FIG. 3 includes terminals 312 and 314 at the left to which the AC line voltage is applied, a rectifier designated generally as 300 and a filter designated 320. Rectifier 300 is coupled to filter 320 by an electronic circuit breaker 330.

As illustrated, terminals 312 and 314 are connected to mutually opposite terminals of a bridge rectifier designated generally as 310. One of the remaining terminals is coupled to chassis and a pulsating voltage appears at an output terminal 316 of rectifier 310.

Terminal 316 is coupled by the anode-cathode path of an SCR 332 to a pi filter including storage capacitors 322 and 324 and a resistor 326. SCR 332 is the control element of circuit breaker 330.

The gate of SCR 332 is coupled to the emitter of a driver transistor 334, the collector of which is coupled by a resistor 336 to the junction of two further resistors 338 and 340. The other ends of resistors 338 and 340 are coupled to capacitor 322 and to terminal 316, respectively. The base of transistor 334 is coupled to filter 322 by a bias retention filter capacitor 350. The base of transistor 334 is also coupled by the series combination of a current limiting resistor 342 and rectifier diode 344 to point 86, the junction of reverse current inductor 82 with input inductor 62. A damping circuit consisting of the series combination of a capacitor 346 and resistor 348 is coupled across inductor 82.

In operation, SCR 332 is biased for conduction whenever the pulsating voltage at terminal 316 of rectifier 310 exceeds the voltage on capacitor 322. At this time, the collector of transistor 334 is also biased by the voltage divider including resistors 338 and 340. SCR 332 will receive a gating signal from the emitter of transistor 334 so long as an alternating signal as shown in FIG. 2f appears at terminal 86 relative to the voltage across capacitor 324 for rectification by diode 344. In the event that SCR 84 remains conductive, for example, due to a short circuit, the alternating signal does not appear and the circuit breaker opens.

The arrangement of the invention advantageously provides low power consumption similar to that of the forward current type of regulator with the reliability of control of the reverse current regulator. In the event of false or early triggering of thyristor 84, due to picture tube flashover, noise, incorrect trigger conditions or servicing, the deflection and ultor voltages decrease.

If the thyristor 84 becomes a short-circuit, which is the most common failure mode, the resonant period becomes shorter than is the case with inductor 82 not shorted. This results in a substantial decrease in the voltage remaining at point 43 in FIG. 3 at the beginning of the commutating interval, as shown by portion 222 of waveform 220 in FIG. 2d.

The power consumption is reduced by comparison with the saturable-reactor reverse-current regulators because only a substantially direct current flows in the reverse-current reactor, thereby avoiding core losses such as may occur when alternating currents flow in a reactor. Furthermore, the peak magnitude of the substantially constant reverse current is small, so that the magnitude of the RMS current and dissipation in the reverse reactor is small, and small wire can be used to wind the reactor. A further advantage of the inventive arrangement is the relatively low sensitivity of regulator controller 80 to gating time. This comes about because earlier gating of thyristor 84 increases the energy stored as current in inductor 62 at the beginning of the energy accumulation interval, while it also increases the reverse current in inductor 82. These two effects will cancel to a certain degree and thereby reduce the sensitivity of the controller.

Thus, the principle of the invention resides in an inductor carrying an average forward current and energy from B+ to a deflection circuit load, together with a second inductor carrying an average reverse current which reduces the energy in the deflection circuit load, where the average reverse current in the second inductor depends upon the interval during which a voltage tending to promote the reverse current is applied under the control of a switch to the inductor.

Other embodiments will be obvious to those skilled in the art. In particular, the series arrangement of controller 80 and inductor 62 may be rearranged with the left-hand end of inductor 62 coupled to B+ and the right-hand end of inductor 82 connected to point 43. The SCR must of course continue to be connected in series with the smaller inductor between B+ and point 43.

In a particular embodiment of the invention, satisfactory operation was achieved for a 220 volt, 50 Hz source with the following component values:

INDUCTORS

62—2 mH
82—10 mH

CAPACITORS

350—10 nF
346—2.2 nF

RESISTORS

336—680
338—150
340—1500
342—10K
348—1K

What is claimed is:

1. A kinescope deflection apparatus including a feedback voltage regulator, comprising:
   a deflection winding disposed about the kinescope;
   deflection switching means coupled with said deflection winding for controlling the flow of current therein during trace and retrace intervals of the deflection cycle and for establishing the voltage being regulated;
   a source of energizing potential;
   first inductance means, said first inductance means being coupled between said source of energizing potential and said deflection switching means for allowing the flow of a first current therebetween;
   controllable switch means including a control electrode and also including a controlled current path serially coupled with said first inductance means for controlling the average value of said first current;
   control means coupled to said control electrode and to the voltage being regulated for controlling the operating time of said controllable switch means in a manner to regulate the average current supplied to said deflection switching means; and
   second inductance means having a first terminal coupled to a terminal of said first inductance means and a second terminal coupled to the end of said controlled current path of said controllable switch means remote from said first inductance means for conducting a second current between said source of energizing potential and said deflection switching means the average value of which is poled oppositely to the average value of said first current.

2. A kinescope deflection apparatus according to claim 1, wherein said:
   controllable switch means comprises a thyristor controlled current anode-cathode path of which is poled to conduct in the direction of said first average current.

3. A kinescope deflection apparatus according to claim 1, wherein said controllable switch means comprises a gated semiconductor and said control means comprises time-modulated pulse generating means.

4. A kinescope deflection apparatus according to claim 1, wherein said control means comprises pulse- ...ration modulation means responsive to said voltage being regulated, the change of duration as a function of the magnitude of the voltage being regulated being poled for inverse feedback regulation of said voltage being regulated.

5. A kinescope deflection apparatus according to claim 1 wherein the average of said first current flow transfers energy from said source of energizing potential to said deflection switching means.

6. A kinescope deflection apparatus according to claim 5 wherein said control means comprises time-modulated pulse generating means poled to increase the average of said first current in response to an increase in said regulated voltage.

7. A kinescope deflection apparatus according to claim 5 wherein the average of said second current transfers energy from said deflection switching means to said source of energizing potential.

8. A kinescope deflection apparatus according to claim 7 wherein said control means comprises time-modulated pulse generating means poled to increase the average of said second current in response to an increase in said regulated voltage.

9. A kinescope deflection apparatus according to claim 8 wherein said control means is poled to increase the average of said first current in response to an increase in said regulated voltage.

10. A kinescope deflection apparatus according to claim 9 wherein said increase in said second current in response to an increase in said regulated voltage exceeds said increase in said first current whereby inverse feedback control of said regulated voltage is accomplished.

11. A kinescope deflection apparatus according to claim 10 wherein said deflection switching means comprises bidirectional switch means serially coupled with said first inductance means, and energy storage means coupled to the juncture of said bidirectional switch means and said first inductance means for storing the energy which the average current entering said deflection switching means represents.

12. A kinescope deflection apparatus according to claim 11 wherein said bidirectional switch means recurrently couples a portion of the energy stored in said energy storage means to said deflection winding for maintaining said flow of current therein during trace and retrace intervals of said deflection cycle and for maintaining the voltage being regulated.

13. A kinescope deflection apparatus including a feedback voltage regulator, comprising:
a deflection winding disposed about the kinescope;
deflection switching means coupled with said deflection winding for controlling the flow of current therein during trace and retrace intervals of the deflection cycle and for establishing the voltage being regulated;
a source of energizing potential;
first inductance means coupled to said source of energizing potential and to said deflection switching means for supplying energy to said deflection switching means from said source of energizing potential;
second inductance means serially coupled with said first inductance means;
controllable switch means including a control electrode and a controlled current path coupled in parallel with said second inductance means; and
control means coupled to said control electrode and to the voltage being regulated for controlling the operating time of said controllable switch means in a manner to regulate the energy supplied to said deflection switching means.

14. A deflection apparatus according to claim 13 wherein said controllable switch means comprises a thyristor poled for current flow from said source of energizing potential to said deflection switching means.

15. A kinescope deflection apparatus including a voltage regulator comprising:
a deflection winding disposed about the kinescope;
bidirectional switch means coupled in parallel with said deflection winding;
a source of energizing potential;
first inductance means coupled between said source of energizing potential and said bidirectional switch means for supplying operating energy to said deflection apparatus;
second inductance means serially coupled with said first inductance means;
controllable switch means coupled in parallel with said second inductance means; and
control means coupled to said controllable switch means and to the regulated voltage for controlling the operating time of said controllable switch means in a manner to control said operating energy and maintain said regulated voltage.

16. A energy regulator for a kinescope deflection arrangement comprising:
a deflection winding disposed about the kinescope;
a voltage source serially coupled with said deflection winding;
first bidirectional switch means coupled in parallel with the serial combination of said deflection winding and said voltage source for establishing trace and retrace current flow in said deflection winding during respective trace and retrace intervals of the deflection cycle;
reactive energy storage means including a first terminus coupled to a first electrode of said first bidirectional switch means;
second bidirectional switch means having a first electrode coupled to a second terminus of said reactive energy storage means and having a second electrode coupled to a second electrode of said first bidirectional switch means for recurrently coupling energy from said reactive storage means during a commutating interval of said deflection cycle;
first inductance means;
second inductance means serially coupled with said first inductance means;
a source of energizing potential;
first coupling means for coupling said first and second inductance means with said source of energizing potential and with said reactive energy storage means;
controllable switch means coupled in parallel with said first inductance means; and
control means coupled to said controllable switch means and to said reactive energy storage means for controlling the operating time of said controllable switch means during said deflection cycle in such a manner as to control the energy stored in said reactive energy storage means at the beginning of said retrace interval.

17. A horizontal deflection circuit for a television receiver having a horizontal first stage including means for controlling line sweep and commutation, the energy required by each horizontal first stage being provided by a controllable supply circuit comprising:
- a source of DC energy;
- a storage inductance;
- a second inductance connected in series with said storage inductance, said series connection being disposed between said source of DC energy and said horizontal final stage; and
- a thyristor connected in parallel with said second inductance and controlled to allow current from said source of DC energy to bypass said second inductance and flow directly to said storage inductance, whereby current returning to said DC source from said storage inductance must flow through said second inductance.

* * * * *

UNITED STATES PATENT AND TRADEMARK OFFICE
CERTIFICATE OF CORRECTION

PATENT NO. : 4,186,330
DATED : January 29, 1980
INVENTOR(S) : Walter Böhringer

It is certified that error appears in the above-identified patent and that said Letters Patent is hereby corrected as shown below:

Column 4, line 12, "in parallel windings 22" should read -- in parallel with windings 22 --. Column 11, line 2, "by each horizontal" should read -- by said horizontal --.

Signed and Sealed this

Twenty-ninth Day of April 1980

[SEAL]

Attest:

SIDNEY A. DIAMOND

Attesting Officer

Commissioner of Patents and Trademarks